READ-WRITE NETWORK FOR CONTENT ADDRESSABLE MEMORY
Filed Dec. 30, 1964 2 Sheets-Sheet 1
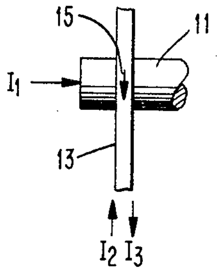
FIG. 1a
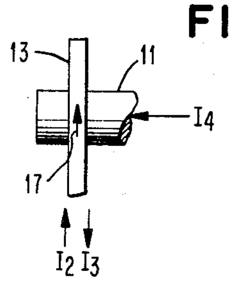
FIG. 1b
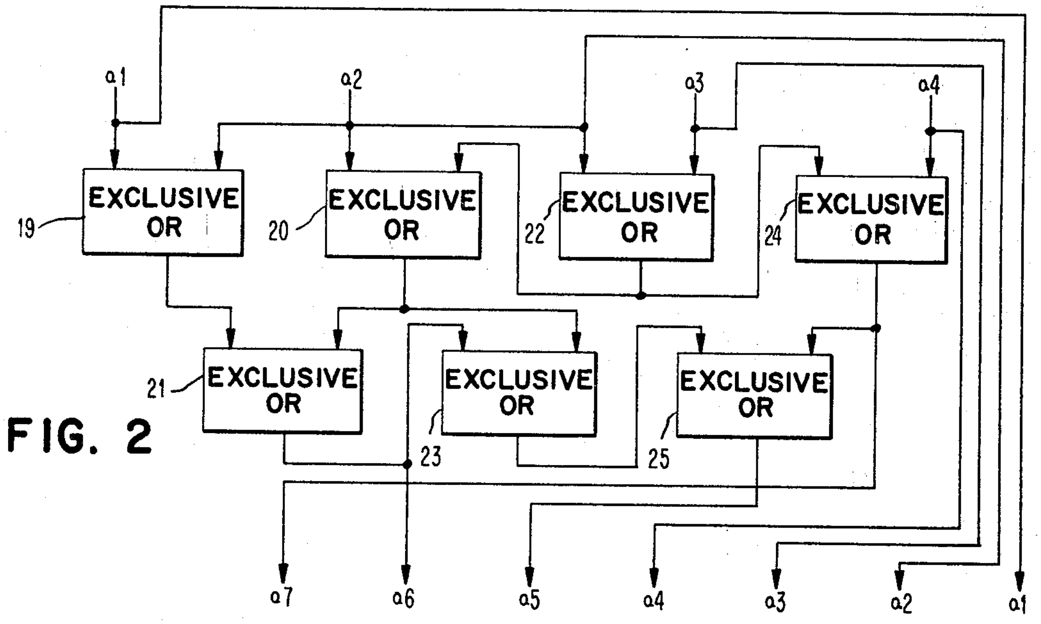
FIG. 2
| a | OUTPUT | | | | | | |
|---|---|---|---|---|---|---|---|
| | 7 | 6 | 5 | 4 | 3 | 2 | 1 |
| | 0 | 1 | 1 | 0 | 0 | 0 | 1 |
| | 1 | 1 | 0 | 0 | 0 | 1 | 0 |
| | 1 | 0 | 1 | 0 | 0 | 1 | 1 |
| | 1 | 1 | 1 | 0 | 1 | 0 | 0 |
| | 1 | 0 | 0 | 0 | 1 | 0 | 1 |
| | 0 | 0 | 1 | 0 | 1 | 1 | 0 |
| | 0 | 1 | 0 | 0 | 1 | 1 | 1 |
| | 1 | 0 | 1 | 1 | 0 | 0 | 0 |
| | 1 | 1 | 0 | 1 | 0 | 0 | 1 |
| | 0 | 1 | 1 | 1 | 0 | 1 | 0 |
| | 0 | 0 | 0 | 1 | 0 | 1 | 1 |
| | 0 | 1 | 0 | 1 | 1 | 0 | 0 |
| | 0 | 0 | 1 | 1 | 1 | 0 | 1 |
| | 1 | 0 | 0 | 1 | 1 | 1 | 0 |
| | 1 | 1 | 1 | 1 | 1 | 1 | 1 |
INPUT
FIG. 2a
*INVENTOR*
LESTER M. SPANDORFER
BY William E. Cleaver
*ATTORNEY*

READ-WRITE NETWORK FOR CONTENT ADDRESSABLE MEMORY

Filed Dec. 30, 1964 2 Sheets-Sheet 2

United States Patent Office 3,408,638

Patented Oct. 29, 1968

3,408,638

READ-WRITE NETWORK FOR CONTENT ADDRESSABLE MEMORY

Lester M. Spandorfer, Cheltenham, Pa., assignor to Sperry Rand Corporation, New York, N.Y., a corporation of of Delaware Filed Dec. 30, 1964, Ser. No. 422,109
2 Claims. (Cl. 340—174)

ABSTRACT OF THE DISCLOSURE

The present device provides an encoder means which translates any particular machine word into an increased number of bits per digit. The code into which the machine code is translated guarantees a minimum number of bit difference between any two information words. Accordingly, when there is an interrogation of the plated wire memory there is a large signal-to-noise ratio which enables the system to distinguish between a match and a mis-match of the interrogation signals with the signals stored in the plated wire memory.

Figure 3:
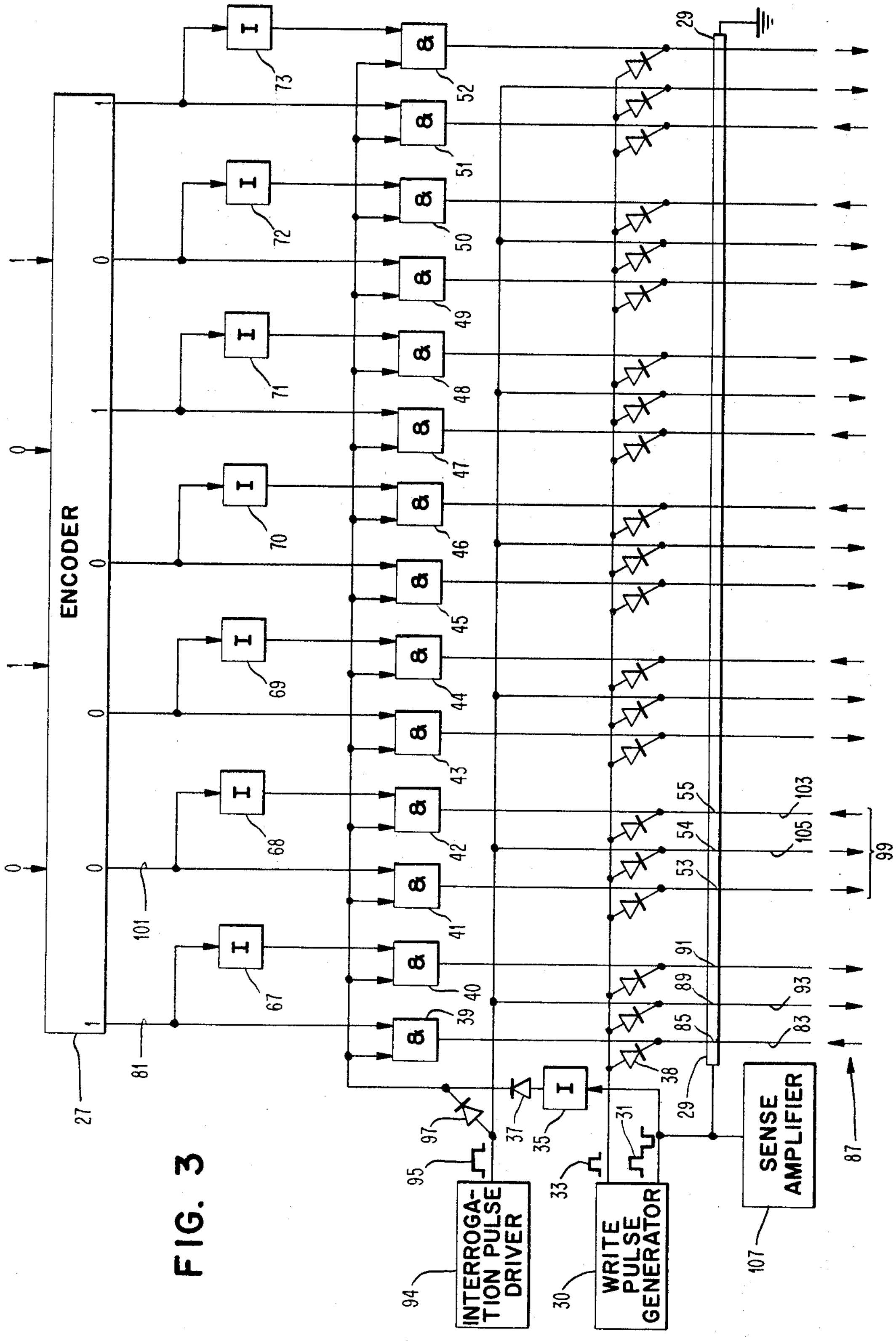

This invention relates to search, or associative, memories, and more particularly, to an interrogation system for use with a fully parallel content addressable memory.

Conventional digital memories store words at memory locations or addresses. Access to any word is gained by first generating the appropriate address to the memory. A content addressable memory is organized such that its words are accessible on the basis of word content, rather than word location or address. Content addressable memories are sometimes called associative memories, search memories, or tag memories. The class of content addressed memory, hereinafter referred to as CAM, of particular interest in this invention is the parallel interrogated CAM; that is, one in which all appropriate bits of all the words in the memory or in a corresponding portion of each word of the memory are searched simultaneously or in parallel. The notion of simultaneity here applies both to the bits and to the words.

One of the fundamental problems in parallel CAM's is distinguishing, for any and all words, between the conditions of match and mismatch. In practice, the system is often designed such that a bit match is ideally represented by the absence of a signal, and a bit mismatch gives rise to a signal of $e$ volts. Consequently, if a match is obtained between the bits of the interrogating word and all of the searched bits in a given word, the sum of the individual bit responses is zero. However, in actual practice, the signal generated by a matched bit is not quite zero, but is instead a non-zero value of $\Delta$. It will be shown in subsequent description that $\Delta$, in a specific embodiment, is actually the difference between two signals which are approximately equal to one another. The ratio $e/\Delta$, or the mismatch-to-match response of a bit, is important to the operation of a parallel CAM, with a large value of this ratio being advantageous in the system design. If there are $n$ bits per word being searched in a given operation, the match signal is given by $n\Delta$. The one-bit-mismatch signal is given $e+(n-1)\Delta$. Since a mismatch greater than one bit gives a signal greater than $e+(n-1)\Delta$, the critical case to be distinguished by a match-no-match detector is between match and one-bit-mismatch. The ratio of the latter two signals, which will be henceforth called the detector discrimination ratio or the detector input signal-to-noise ratio, is given by $$\frac{e+(n-1)\Delta}{n\Delta}$$

If $e \gg (n-1)\Delta$, this expression reduces to $$e/n\Delta$$

From the above expression it can be ascertained that the discrimination ratio tends to become relatively poor when $n$, the number of bits searched, becomes large, and tends to improve when $n$ is small. Thus in order to search a large number of bits in parallel, a practical detector requires a suitably large or favorable discrimination ratio. In addition, a practical and simple detector usually has a natural threshold which cannot be easily varied. It is desired that the mismatch signal be at least large enough to exceed this threshold. The purpose of the present invention is to provide a means of insuring both a favorable discrimination ratio and a suitably large absolute mismatch signal for exceeding the detector threshold.

Normally, the coincidence is detected by matching each bit of the interrogation word against each bit of each stored word (or at least the portions thereof, called tags, which are being used for the interrogation). In one embodiment of a content addressable memory each bit is stored by magnetizing three locations of the memory. For instance, a binary ONE is stored by magnetizing two adjacent locations with a plus-minus combination, wherein plus represents one state of magnetic remanence and minus represents the other state of magnetic remanence. Plus and minus are used as the notation because ONE and ZERO are used in the discussion with reference to the binary notations. In such a system a binary ZERO can be stored by magnetizing two adjacent locations as a minus-plus combination. Further, in such a content addressable memory a bias bit is also written alongside or between the two adjacent magnetized locations. The three magnetized locations make it possible to ideally provide a negligible signal when there has been a match and a finite signal when there is a mismatch. The results are accomplished as follows: when the system is interrogated for a binary ONE (which has been stored by magnetizing the two positions, adjacent to the bias position, in a plus-minus manner), the bias signal representing a plus magnetization would be pulsed to provide a positive signal while the negative position of the ONE information would also be pulsed to provide a negative signal. The resulting positive pulse and negative pulse would nullify one another and ideally there would be no finite signal readout. However, actually since the structures of the adjacent wires are different and since the adjacent wires overlap the plated wires in different manners the induced voltages are not exactly alike and the signals do not entirely cancel, there is a small signal produced which is referred to as $\Delta$. In a like manner, when the system is interrogated for a binary ZERO condition which has been stored minus-plus, the bias position would be driven to provide a plus signal and the negative position of the ZERO information would be driven to provide a negative signal. These last-mentioned two signals would ideally nullify one another and result in a no finite signal output.

Unfortunately, in such content addressable memories if the binary words which are used are separable one digit from another by simply one bit there is a problem. For example, if there is a mismatch between two digits by simply a single bit, the output signal for the mismatch is relatively small. It has been found in practice, in fact, that this output signal is sometimes indistinguishable from the Δ signals. The present invention provides a scheme whereby the information is stored in such a fashion that there is never simply a single bit difference between any two information words, and depending upon the input signal-to-noise ratio, which may be desired, the system can be arranged to have any guaranteed minimum number of bits difference between any two information words. The present invention provides a large output signal which is sufficiently large to be unaffected by any number of Δ signals.

Accordingly, it is an object of the present invention to provide an improved interogation system to be used with a content addressable memory.

It is a further object of the present invention to provide an interrogation system to be used with a content addressable memory which provides a high input signal-to-noise ratio.

In accordance with a feature of the present invention, there is provided an encoder means which translates any particular machine word into an increased number of bits per digit in accordance with the concept of the invention.

In accordance with another feature of the present invention there are means which provide for applying the interrogation information in such a manner so as to generate an insignificant signal for a match condition and a significant signal for a mismatch condition.

The above-mentioned and other features and objects of the present invention will become more apparent by reference to the following description taken in conjunction with the accompanying drawings in which:

FIGURES 1*a* and 1*b* are schematics which show the relationship of the magnetic vectors of a thin film wire and the drive current passing therethrough;

FIGURE 2 is a block diagram showing an encoder which can be used with the present invention;

FIGURE 2*a* is a table of the input to output results of encoder of FIGURE 2.

FIGURE 3 is a schematic diagram of a structure which can be used to incorporate the present inventive idea.

Within the data processing art there have been developed a number of codes. These codes serve various purposes; for instance, the Excess-3 code insure the system that every digit will be represented by some sort of signal as compared with other codes wherein ZERO is represented by no signal. Other codes such as the reflected codes were developed so that the change from one digit to another would be by a single bit and thus would increase the speed of the system. In still other codes, there has been a concern for correction of errors and it is accordance with these codes that the present invention primarily operates although as will become more apparent hereinafter the present invention could operate with many types of codes.

One of the popular correction code schemes we shall designate as the (7, 4, 3) code, the foregoing numbers standing for a seven bit output encoding of a 4-bit input word in which each of the output words is separated by a minimum distance of 3. "Distance" is defined as the minimum number of bits which can form a difference between one word and another in such a code. In the (7, 4, 3) code would never be less than 3 bits. The present invention employs such a code with a content addressable memory to insure that a mismatch between two words is always recognized by a minimum difference of three bits, rather than by a difference of one bit, which would exist with the original 4-bit code or which might be possible using some other code. In this way, the present system provides a good input signal-to-noise ratio. In view of the Δ signals (match noise) and in view of the small signals which a magnetic memory normally provides, this good input signal-to-noise ratio is highly desirable.

Consider first FIGURE 1*a*, which shows the relationship between a signal recorded on a plated wire memory and the bit currents which are driven along the plated wire memory, as well as the drive currents which are transmitted orthogonal to the plated wire memory. In FIGURE 1*a* there is shown a plated wire 11 over which there is coupled a drive wire 13. When there is current I1 driven down the plated wire 11 as shown and at the same time there is a drive signal either I2 or I3, as shown, the magnetizable bit position defined by the plated wire memory 11 and the drive wire 13 will store a magnetic vector 15 as shown. In a similar manner, in FIGURE 1*b* there is shown a plated wire memory 11 and the drive line 13. If the bit current transmitted along the plated wire memory is I4, as shown, then in response to either of the drive currents, I2 or I3, the magnetizable bit position defined by the plated wire 11 and the drive strap 13 will be magnetized and store the magnetic vector 17 as shown. It becomes apparent after considering FIGURES 1*a* and 1*b* that the final direction in which the magnetizable bit position is magnetized, when storing information, is primarily in response to the bit current down the drive line, i.e., either I1 or I4.

Consider now FIGURE 2 which shows an encoder for transforming a 4-bit input word, the four bits being *a*1, *a*2, *a*3 and *a*4, into 7-bit output word or code the bits being *a*1 through *a*7. The table of FIGURE 2*a* shows the input and output relationship of the bits and by careful examination of the table of FIGURE 2*a* it can be seen that there is never less than a 3-bit "distance" between any two digits shown. If we examine for instance the first word in the table which is 0001, we find that the exclusive OR gate 19 is conditioned to produce an output signal which output signal is transmitted to the exclusive OR gate 21. The output from the exclusive OR gate 21 produces the *a*6 output and is also transmitted to the exclusive OR gate 23. The output from the exclusive OR gate 23 is transmitted to the exclusive OR gate 25 which has an output signal labeled *a*5. Hence, by re-using the input word as part of the output the encoder of FIGURE 2 transforms an input of 0001 into an output of 0110001. The other digits shown in the table of FIGURE 2*a* can be worked out through the encoder of FIGURE 2. Obviously, the encoder of FIGURE 2 represents only one coding scheme of many coding schemes. It is to be clearly understood that the present invention is not limited to a (7, 4, 3) code arrangement, but it has been found empirically that a 3-bit difference is a very useful difference for a good signal-to-noise ratio (although obviously differences of 4, 5, 6, etc. would give a larger signal-to-noise ratio).

Consider FIGURE 3 in which the encoder 27 is the encoder of FIGURE 2. In FIGURE 3 we have shown input signals which represent a coded number five, that is 0101 from which here is a 7-bit output, 1000101, in accordance with the table of FIGURE 2*a*.

To digress for a moment, let it be understood that each bit will be recorded in the plated wire memory system of FIGURE 3 by magnetizing three positions on the plated wire memory device 29. The middle position of the three positions, that are magnetized, will be considered the fixed bias position and it will always be magnetized in a downward direction as shown. In accordance with the scheme of FIGURE 1*a*, the bias positions of the plated wire memory 29 will be magnetized by a bit current I1 being driven along the center of the plated wire in conjunction with a drive current. The two bit positions lying on opposite sides of the bias position will serve collectively to record whether there is a ZERO or a ONE condition recorded at any three bit location on the magnetizable line 29.

When the system is in operation initially there is a write pulse signal 31 generated. It will be noted that the write pulse 31 is composed of first a plus signal, and then a minus signal when considered left to right. The plus signal is transmitted down the plated wire memory line 29 and at the same time each of the drive lines overlying the plated wire memory 29 is also driven by a plus signal 33, which serves to help each of the positions to be magnetized with a vector in a downward position or the plus position. The plus signal 33 is transmitted through each of the diodes, such as diode 38, to the respective drive lines.

At the same time the plus signal 31 is transmitted to the inverter 35 and is inverted into a negative signal which is blocked by the diode 37 and hence there is no effect on any of the AND gates 39 through 52.

In summary, then, in response to the plus portion of signal 31 and the plus signal 33 each of the magnetizable positions on the plated wire memory device 29 is magnetized in a downward direction. This completes the reset or restore phase for plated wire 29. The restore phase is performed prior to the write phase for a particular plated wire.

Returning now to the encoder 27 assume that each of the output lines which has a ONE signal appearing therein provides a positive signal and each of the lines which has a ZERO appearing therein provides a negative signal. It will be noted that each of the output lines of the encoder is connected to an associated AND gate 39, 41, 43, 45, 47, 49 and 51 as well as to an associated inverter 67 through 73. The output signals from the respective inverters 67 through 73 are also transmitted to associated AND gates 40, 42, 44, 46, 48, 50 and 52. The ONE signal, for instance on line 81 is transmitted to the AND gate 39 to partially condition that AND gate and since, along its other path through inverter 67 it is converted into a negative signal the AND gate 40 is not partially conditioned. In accordance with the foregoing the AND gates 39, 42, 44, 46, 47, 50 and 51 are all partially conditioned by the ONE signals from the encoder to receive a positive signal from diode 37 which fully conditions those AND gates. These last-mentioned AND gates accordingly each transmit a signal therefrom.

During the second half of the write pulse signal 31 the negative portion is transmitted to the inverter 35 and is inverted into a positive signal, which is transmitted to each of the AND gates 39 through 52 and fully conditions the AND gates 39, 42, 44, 46, 47, 50 and 51 in conjunction with the ONE (positive) signals mentioned earlier. The negative half of the write signal results in magnetizing each position with a ONE in a negative direction. By way of example it can be noted that gate 39 transmits a drive signal along the drive line 83. Since at this time there is a negative signal applied to the plated wire memory 29, which signal is analogous to I4 of FIGURE 1*b*, the magnetizable position 85, defined by the wire 29 and the drive line 83, is magnetized in a negative direction, that is in the upper direction as shown. Each of the bit positions along the plated wire memory 29 are magnetized in accordance with the same controls and the vectors 87 designate how these positions are magnetized in response to the input signals 1000101 representing the digit five.

Now, in order to effect a read-out or an interrogation, the present system operates to drive each of the bias positions, as well as each of the negative positions to determine if there is a match. In this way, the bias position and the negative position at each bit location will cancel one another and hence there will be no read-out signal on the sense line. To make this more meaningful, if the system were to compare the input signals representing a ONE with what was stored in the three magnetizable positions 85, 89 and 91, the bias line 93 would be driven and the negative position 85 would be driven. The way in which this is effected is that the interrogation pulse driver provides a positive signal 95 which is transmitted to each of the bias lines and hence causes the bias lines to each induce a signal on the sense line 29. In order to drive the negative position by the drive line 83, the positive signal 95 is transmitted through the diode 97 through the AND gate 39 to the drive line 83. In this way the position 85 which is storing the negative information is driven to induce a signal opposite to that of the signal induced by driving position 89. The signals induced will cancel one another indicating that there was a match and hence indicating that a ONE is stored in positions 85, 89 and 91. It becomes clear that if there had been a ZERO stored at the positions 85, 89 and 91 then the vectors would resemble the vectors of the next position 99 and hence the bias signal and the left-hand signal would not have cancelled one another out. In this situation the signals would have been additive and the mismatch would have been determined by the presence of an output signal.

The vectors 99 when interrogated by a ZERO condition cancel out in the same manner. For instance, when the positions 53, 54 and 55 are interrogated by a ZERO condition the lines 103 and 105 are energized. The ZERO output on line 101 is inverted at the inverter 68 and transmitted to the AND gate 42. Hence, the AND gate 42 responds to the positive signal 95 and the line 103 and line 105 are both driven to provide cancelling induced signals, indicating a match.

The remaining description of the system seems unnecessary since it operates in a manner which was just described.

The induced signals are sensed by the sense amplifier 107 and there is either an indication of a match or an indication of a mismatch, by the absence or presence of a signal. Now, if the code shown in the table of FIGURE 2*a* or a similar code is used, then the distance or the difference between any two digits in the system will be at least three bits. Hence there will be an additive induced signal on the line 29 so that the noise which is normally produced in such a system cannot provide an amplitude which approaches the ampiltude of the three bit difference signal.

While I have described above the principles of my invention and in connection with specific apparatus, it is to be clearly understood that this description is made only by way of example and not as a limitation of the scope of my invention, as set forth in the objects thereof and in the accompanying claims.

The embodiments of the invention in which an exclusive property or privilege is claimed are defined as follows:

1. A content addressable memory comprising: encoder means to convert $n$ input signals of a first code into $m$ output signals of a second code whereby the distance between any two digits in said last mentioned code is $k$ signals, where $k$ is greater than one; plated wire memory means having a plurality of magnetizable positions to store information; a plurality of AND gates each of which is connected to a different one of said magnetizable positions and each of which is further connected to the output of said encoder means; write pulse generator means which is connected to said magnetic memory means and to said plurality of AND gates; biasing means connected to said memory means to store at least $m$ positions of bias information; and interrogation circuitry connected to said plurality of AND gates and to said biasing means, said plated wire memory means responsive to signals from said interrogation circuitry means to provide significant signals therefrom if the information representing interrogating signals does not match the information stored in said plated wire memory means and to provide insignificant signals therefrom if the information representing interrogating signals does match the information stored in said plated wire memory means.

2. A content addressable memory according to claim 1 wherein said write pulse generator means is further connected to the outputs of each of said AND gates and said bias means in order to provide a signal which will reset each of the magnetizable positions of said plated wire memory means.

References Cited

UNITED STATES PATENTS

| | | | |
|---|---|---|---|
| 3,311,901 | 3/1967 | Fedde et al. | 340—174 |
| 3,245,033 | 4/1966 | Plouffe et al. | 340—146.1 |
| 3,247,489 | 4/1966 | Sussenguth | 340—172.5 |
| 3,300,760 | 1/1967 | Franks et al. | 340—172.5 |

OTHER REFERENCES

Humphrey: Switching Circuits, 1958, McGraw-Hill Book Co., pp. 85–89.

Richards: Arithmetic Operations in Digital Computers, 1961, D. Van Nostrand Co., pp. 185–190.

PAUL J. HENON, *Primary Examiner.*

P. R. WOODS, *Assistant Examiner.*